C. B. Barlow.
Game.
No. 95,969. Patented Oct. 19, 1869.
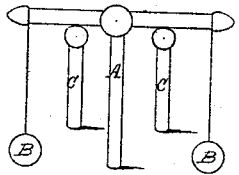
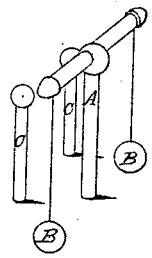 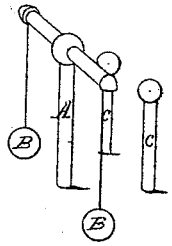
Fig. 1.
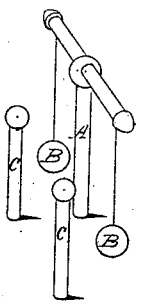 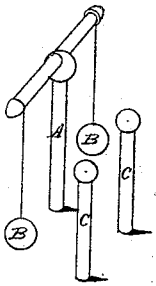
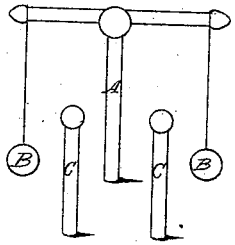
Fig. 2. Fig. 3.
Fig. 4.
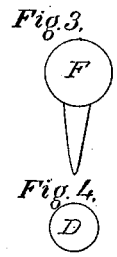 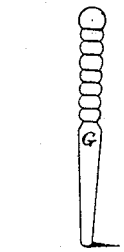 Fig. 5. 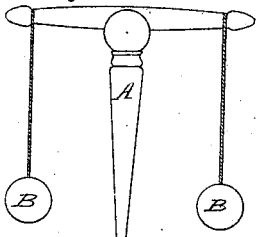
Fig. 7.
Fig. 6.
Witnesses
E. W. Anderson
W. W. Kane
Inventor
C. B. Barlow
Chipman, Hosmer, & Co.
Attorneys.
N. PETERS, PHOTO-LITHOGRAPHER, WASHINGTON, D. C.

United States Patent Office.

CHARLES B. BARLOW, OF PORTSMOUTH, NEW HAMPSHIRE.

Letters Patent No. 95,969, dated October 19, 1869.

GAME.

The Schedule referred to in these Letters Patent and making part of the same.

*To all whom it may concern:*

Be it known that I, CHARLES B. BARLOW, of Portsmouth, in the county of Rockingham, and State of New Hampshire, have invented a new and valuable Improvement in Games; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of the implements of play used in my game as arranged on the ground.

Figure 2 is a view of the mallet.
Figure 3, central ball or joker.
Figure 4, playing-ball.
Figure 5, stake and swinging balls.
Figure 6, wicket-pin.
Figure 7, score-table.

My invention relates to field-sports, and consists mainly in a game to be played, with suitable implements, on a lawn or smooth piece of ground.

The implements of play consist of six stakes, marked A in the drawings, each having a cross-bar on top, from each end of which depends a ball, B, touching the ground; twelve wicket-pins, C; six playing-balls, D; six mallets, E; one large ball for centre of circle, marked F; one starting-post, G; and six score-tables, H.

In arranging the ground for play, the cross-bar stakes A should be placed in a circle of from six to twelve feet in diameter, at the option of the players; the stakes at equal distances apart.

The wicket-pins C are arranged, in pairs, in front of and three feet from each stake A, and the two pins forming a pair eight inches from each other.

The starting-post is placed six feet from wicket No. 1, directly in front.

Wickets are numbered from 1 to 6, counting from left to right. Cross-bar stakes the same.

The balls depending from the cross-bars are numbered from 1 to 12, counting from left to right.

The game is thus scored: Running each wicket scores one; each cross-bar stake, two; each swinging ball, three; the centre ball or joker, ten.

Rules of the Game.

First. In starting, place the playing-ball one-half mallet's length from the starting-post G, and play through wicket No. 1. Continue to stake and balls No. 1, and then to the joker in the centre. If either wicket, stake, or ball is missed, the player will await his next turn, as designated by the color on the starting-post.

Second. If wicket, stake, ball, and joker are made in succession, the player calls "joker," and the umpire scores the game twenty, and the player continues his play for position for running wicket No. 2, and so on around the circle.

Third. All calls for joker count twenty-three, with exception of the call for joker of the first wicket, stake, and ball, which counts twenty.

Fourth. After making the last joker, play for ball No. 12, and finish by hitting the starting-post. The player then becomes a tease, and can play upon any ball upon the ground, keeping back his opponents from position, and assisting his partners.

Fifth. Any player can drive an opponent's ball out of position, if struck by the playing-ball while making his tour of play; but the same ball cannot be struck twice during the same tour, unless the playing-ball score a wicket, stake, or swinging ball.

Sixth. Any player making the joker is entitled to one and a half mallet's length toward the next wicket to be played for.

Seventh. Any ball driven from the field can be placed within limits, on a line with its former position.

Eighth. The game can be made much more interesting by choosing two leaders, who select partners, one side playing with the dark, the other with the light balls. A score-keeper should be selected, to score the game as played. By doing so no altercations can arise, as each player has a table corresponding in color to his playing-ball. No allowance can be made for unevenness of ground. All balls must be played from where they stop, unless outside the limits.

Ninth. The joker must invariably be made in succession with each wicket, stake, and swinging balls.

The playing-balls are colored, each with a different color, thus, red, brown, green, blue, yellow, and white, and each has a mallet, pair of wicket-pins, stake, and swinging balls of same color. A score-table of the same color is also provided for each.

The mallet used in my game has a spherical head.

The central ball or joker has a pin for fixing it in the ground.

The starting-post has six rings of colors similar to those of the six playing-balls, to indicate the order of play.

I have named this game "Le Circle."

What I claim as my invention, and desire to secure by Letters Patent, is—

The implements herein described, for playing the game "le circle," when constructed, colored, and arranged substantially as specified.

In testimony that I claim the above, I have hereunto subscribed my name, in the presence of two witnesses.

CHAS. B. BARLOW.

Witnesses:
J. M. EDMONDS, Jr.,
J. M. EDMONDS.